United States Patent

Hiouani

[11] Patent Number: 5,141,539
[45] Date of Patent: Aug. 25, 1992

[54] SMOKE FILTERING APPARATUS

[76] Inventor: Mouloud Hiouani, 3 North St., Staten Island, N.Y. 10302

[21] Appl. No.: 807,593

[22] Filed: Dec. 16, 1991

[51] Int. Cl.$^5$ .................... B01D 53/04; B01D 50/00
[52] U.S. Cl. .................... 55/385.1; 55/387; 55/422; 55/473
[58] Field of Search .................... 55/385.8, 387, 422, 55/471, 473, 385.1

[56] References Cited

U.S. PATENT DOCUMENTS 4,043,776  8/1977  Ovel .................... 55/385.8
4,623,367  11/1986  Paulson .................... 55/385.1

Primary Examiner—Charles Hart
Attorney, Agent, or Firm—Leon Gilden

[57] ABSTRACT

An apparatus to direct cigarette smoke and the like in an ambient environment relative to a filter housing includes a base, with the base mounting a support plate to an upper distal end of an adjustable tube adjustably mounted within the base. A filter housing is mounted to the plate to include a fan organization to direct ambient air through the filter, with a surrounding truncated conical shield oriented about the filter housing to effect directing of smoke and the like to the filter.

4 Claims, 4 Drawing Sheets

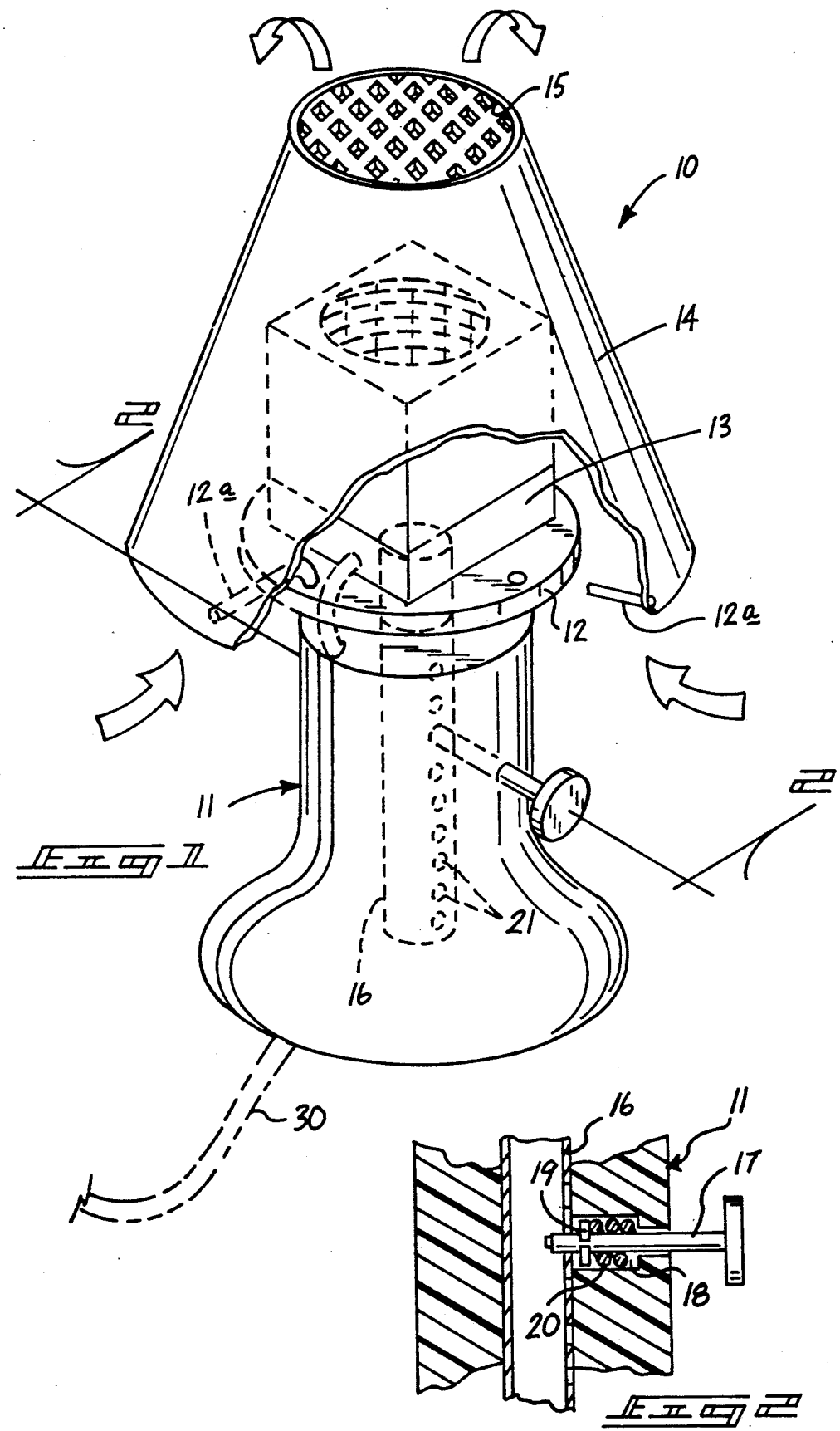

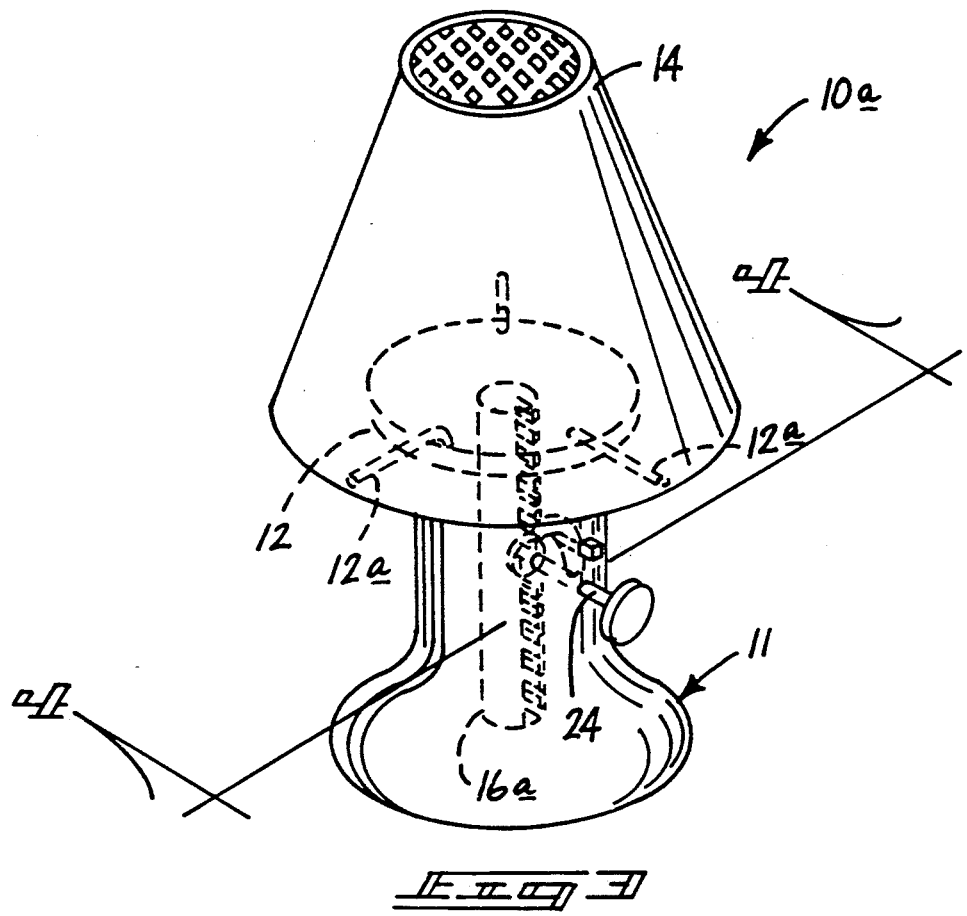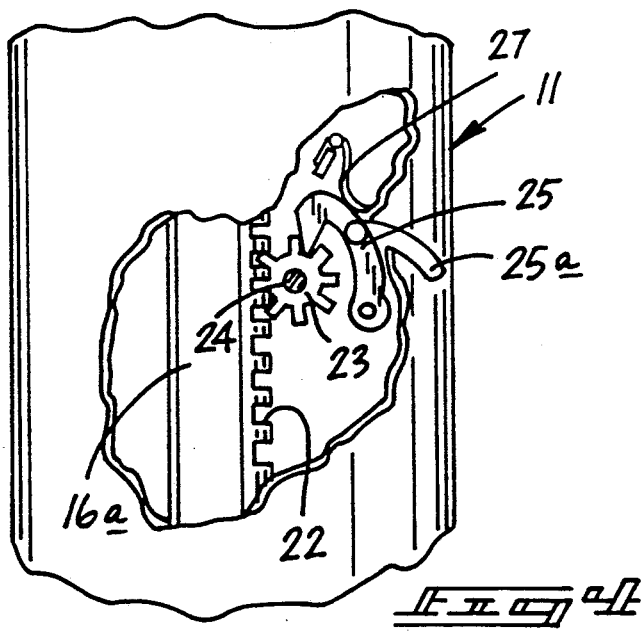

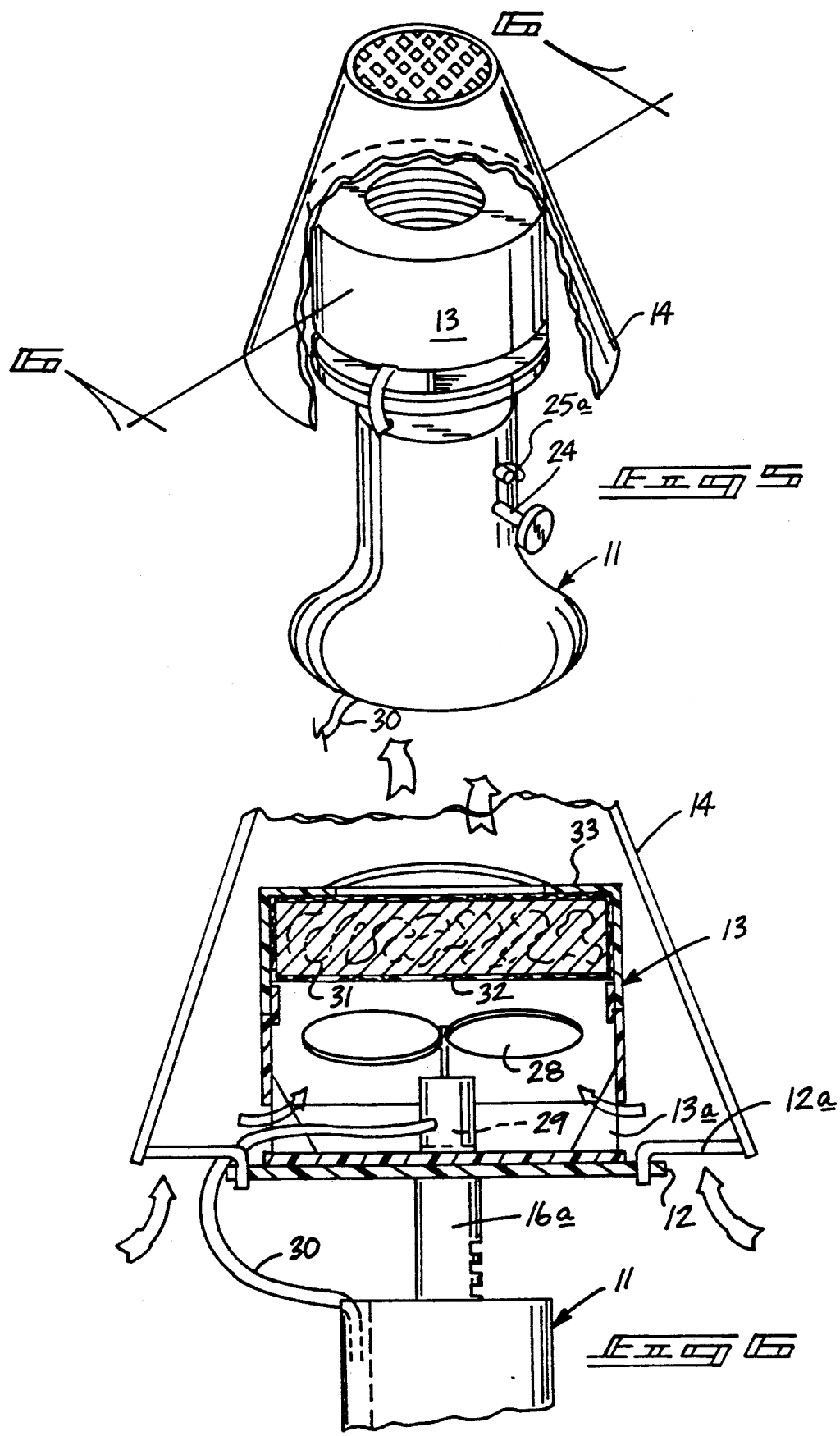

SMOKE FILTERING APPARATUS

BACKGROUND OF THE INVENTION

1. Field of the Invention

The field of invention relates to smoke filtering apparatus, and more particularly pertains to a new and improved smoke filter apparatus to effect filtering of cigarette smoke relative to an ambient environment interiorly of a dwelling or vehicle and the like.

2. Description of the Prior Art

Cigarette smoke and its attendant undesirable characteristics is directed to various filtering structure available in the prior art. The need to provide for a filtering structure to induce filtering therethrough in a compact construction has heretofore not been available. Such filtering apparatus in prior art is exemplified in U.S. Pat. Nos. 4,931,224 to Holzner, Sr.; 4,900,344 to Lansing; and 4,894,071 to Klein.

Accordingly, it may be appreciated that there continues to be a need for a new and improved smoke filtering apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of smoke filtering apparatus now present in the prior art, the present invention provides a smoke filtering apparatus wherein the same is arranged to direct cigarette smoke through a filter house. As such, the general purpose of the present invention, which will be described subsequently in greater detail, is to provide a new and improved smoke filtering apparatus which has all the advantages of the prior art smoke filtering apparatus and none of the disadvantages.

To attain this, the present invention provides an apparatus to direct smoke and the like in an ambient environment relative to a filter housing including a base, with the base mounting a support plate to an upper distal end of an adjustable tube adjustably mounted within the base. A filter housing is mounted to the plate to include a fan organization to direct ambient air through the filter, with a surrounding truncated conical shield oriented about the filter housing to effect directing of smoke and the like to the filter.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out several purposes of the present invention. It is important, therefore, that the claims be regarded as including such equivalent constructions insofar as they do not depart from the spirit, and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved smoke filtering apparatus which has all the advantages of the prior art smoke filtering apparatus and none of the disadvantages.

It is another object of the present invention to provide a new and improved smoke filtering apparatus which may be easily and efficiently manufactured and marketed.

It is a further object of the present invention to provide a new and improved smoke filtering apparatus which is of a durable and reliable construction.

An even further object of the present invention is to provide a new and improved smoke filtering apparatus which is susceptible of a low cost of manufacture with regard to both materials and labor, and which accordingly is then susceptible of low prices of sale of the consuming public, thereby making such smoke filtering economically available to the buying public.

Still yet another object of the present invention is to provide a new and improved smoke filtering apparatus which provides in the apparatus and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BREIF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view, taken along the lines 2—2 of FIG. 1 in the direction indicated by the arrows.

FIG. 3 is an isometric illustration of a modification of the invention.

FIG. 4 is an orthographic partial sectional view, taken along the lines 4—4 of FIG. 3 in the direction indicated by the arrows.

FIG. 5 is an isometric illustration of the filter housing mounted within the apparatus.

FIG. 6 is an orthographic view, taken along the lines 6—6 of FIG. 5 in the direction indicated by the arrows.

DESCRIPTION OF THE PREFERRED EMBODIMENT

Figure 7:
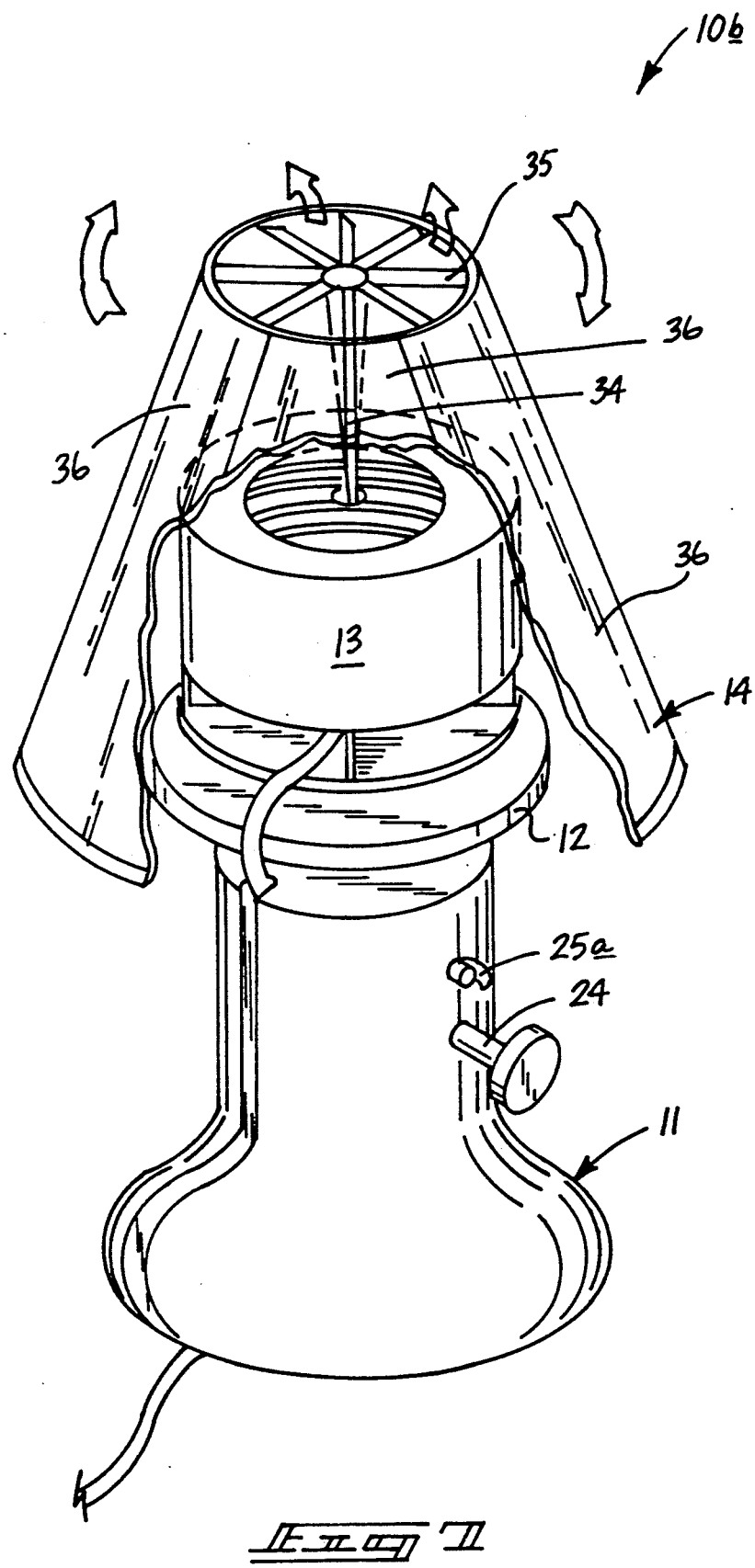
FIG. 7 is an isometric illustration of a further modified aspect of the invention.

With reference now to the drawings, and in particular to FIGS. 1 to 7 thereof, a new and improved smoke filtering apparatus embodying the principles and concepts of the present invention and generally designated by the reference numerals 10, 10a, and 10b will be described.

More specifically, the smoke filtering apparatus 10 of the instant invention essentially comprises a pedestal base 11 coaxially aligned about a single axis extending upwardly to include a support plate mounting tube 16 coaxially and adjustably mounted relative to the pedestal base. An upper distal end of the mounting tube includes a support plate 12 orthogonally mounted thereto, with the support plate integrally securing a filter housing 13. The mounting tube 16 includes a row of mounting tube bores 21 cooperative with a locking rod 17 radially directed into the pedestal base 11 selectively receivable within one of the mounting tube bores 21. The locking rod 17 is received within a locking rod cavity 18 within the pedestal base 11, wherein a locking rod shoulder captures a spring 20 within a shoulder and a rear wall of the cavity 18 to bias the locking rod 17 forwardly and into engagement with one of the bores 21. A truncated conical shade 14 is mounted to the support plate in the apparatus 10, including a chimney 15 coaxially defined at an upper distal end of the shade 14. In this manner, smoke directed between a lower distal end of the shade and the support plate 12 directs the smoke into the filter housing 13 for filtration purposes.

The FIGS. 3 and 4 illustrate a modified apparatus 10a to include a modified support plate mounting tube 16a, including gear rack 22 mounted coextensively along a side of the modified mounting tube 16a parallel to an axis of the mounting tube, with a gear wall 23 in operative engagement with the gear rack. The gear wheel 23 is fixedly mounted to a gear axle 24 that is rotatably mounted through the base 11. A locking dog 25 is biased into engagement with the gear wheel 23 to secure the gear wheel in a latched orientation relative to the gear rack, wherein the use of a biasing spring 27 effects biasing of the locking dog in a manner as illustrated in FIG. 4. A locking dog handle 26 projecting exteriorly of the base 11 permits manual lifting of the dog relative to the gear wheel 23 to permit vertical adjustment of the mounting tube relative to the base 11.

The FIG. 6 illustrates the filter housing 13, including an opening 13a formed adjacent a lower distal end of the housing 13, with a fan motor 29 mounted within the upper distal end of the mounting tube 16a, including fan blades 28 projecting upwardly thereof below a charcoal air 31 that is captured between a filter housing apertured lower plate 32 and a filter housing apertured upper plate 33. In this manner, air directed between the shade 14 and the support plate 12 directs air through the housing for filtering thereof.

The manner of mounting of the shade 14 to the plate 12 is effected through the use of support plate rods 12a extending exteriorly of the plate 12 for engagement adjacent a lower distal end of the shade 14. An alternative manner is set forth in the FIG. 7 and the apparatus 10b, wherein the filter housing includes a shade support axle 34 rotatably mounted to the filter housing 13 coaxially aligned relative to the support base and mounting rod 11 and 16 respectively, wherein the support axle 34 includes fan blade shade supports 35 mounted at an upper distal end thereof, wherein the fan blade shade supports 35 mount to and are integrally secured to the upper distal end of the conical shade 14 at the chimney 15. In this manner, operation of the fan blades 28 effects rotation of the fan blade shade supports 35 when the air directed through the filter housing is imparted to the fan blade shade supports 35. The conical shade 14 is formed with multi-colored panels 36 with such colorations spaced about the shade 14 to provide for amusement of individuals and the acceptance of the apparatus in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A smoke filtering apparatus, comprising,
    a pedestal base, the pedestal base including an elongate mounting tube coaxially aligned relative to the pedestal base and telescopingly received within the pedestal base, and
    the mounting tube includes a support plate integrally and fixedly mounted to an upper distal end of the mounting tube, and the support plate includes a filter means mounted to a top surface of the support plate for filtration of cigarette smoke therethrough, and
    a conical shade fixedly secured relative to the filter housing extending in surrounding relationship relative to the filter housing, wherein the conical shade includes a chimney aligned with the pedestal base, the mounting tube, and the filter housing to direct filtered air therethrough.

2. An apparatus as set forth in claim 1 wherein the mounting tube includes a gear rack mounted to an exterior surface of the mounting tube arranged parallel relative to an axis of the pedestal base, and the gear rack includes a gear wheel in operative engagement with the gear rack, the gear wheel fixedly mounted about a gear wheel axle, the gear wheel axle extending exteriorly of the pedestal base permitting effective rotation of the gear wheel relative to the gear rack, and a locking dog pivotally mounted adjacent the gear wheel for interengagement with the gear wheel for arresting rotation of the gear wheel, wherein the locking dog includes a handle extending exteriorly of the pedestal base with the locking dog positioned interiorly of the pedestal base, and a biasing spring mounted within the pedestal base to bias the locking dog into engagement with the gear wheel.

3. An apparatus as set forth in claim 2 wherein the filter housing includes a housing inlet opening directed into the housing adjacent a lower distal end of the housing, and the housing is arranged in surrounding relationship relative to a plurality of fan blades, the fan blades positioned interiorly of the housing and the fan blades in operative engagement with a fan blade motor, the fan blade motor mounted within an upper portion of the mounting tube, and the fan blades positioned below a charcoal layer within the housing, the charcoal layer contained between a filter housing apertured lower plate and a filter housing apertured upper plate.

4. An apparatus as set forth in claim 3 including a shade support axle rotatably mounted coaxially relative to the filter housing, wherein the shade support axle is coaxially aligned relative to the mounting tube and the pedestal base and orthogonally oriented relative to the support plate, the shade support axle includes a plurality of fan blade shade supports mounted fixedly to an upper distal end of the shade support axle, and the fan blades are positioned within the conical shade chimney coaxially aligned within the conical shade chimney whereupon rotation of the fan blades directs air currents through the fan blade shade supports from the fan blades within the filter housing to effect rotation of the fan blades and the conical shade, and the conical shade including multi-colored panels spaced about the conical shade, wherein the multi-colored panels effect entertainment and amusement of individuals upon rotation of the conical shade.

* * * * *